United States Patent
Schwartz

(10) Patent No.: US 7,113,486 B2
(45) Date of Patent: Sep. 26, 2006

(54) METHOD AND APPARATUS FOR MEASURING QUALITY OF SERVICE PARAMETERS OF NETWORKS DELIVERING REAL TIME MPEG VIDEO

(75) Inventor: Mayer D. Schwartz, Portland, OR (US)

(73) Assignee: TUT Systems, Inc., Lake Oswego, OR (US)

( * ) Notice: Subject to any disclaimer, the term of this patent is extended or adjusted under 35 U.S.C. 154(b) by 159 days.

(21) Appl. No.: 10/428,698

(22) Filed: May 1, 2003

(65) Prior Publication Data
US 2004/0218527 A1 Nov. 4, 2004

(51) Int. Cl.
G01R 31/08 (2006.01)
G06F 11/00 (2006.01)
H04J 1/16 (2006.01)
H04J 3/14 (2006.01)
H04L 1/00 (2006.01)
H04L 12/26 (2006.01)
H04L 12/28 (2006.01)

(52) U.S. Cl. ..................... 370/252; 370/503
(58) Field of Classification Search ............... 370/503, 370/509, 516, 241, 252
See application file for complete search history.

(56) References Cited

U.S. PATENT DOCUMENTS

| | | | | |
|---|---|---|---|---|
| 6,526,446 B1* | 2/2003 | Yang et al. | ................. | 709/230 |
| 2002/0024970 A1* | 2/2002 | Amaral et al. | .............. | 370/468 |
| 2002/0026645 A1* | 2/2002 | Son et al. | .................... | 725/117 |
| 2002/0071434 A1* | 6/2002 | Furukawa | ................... | 370/392 |
| 2002/0152440 A1* | 10/2002 | Yona et al. | ................. | 714/746 |
| 2002/0154694 A1* | 10/2002 | Birch | .................... | 375/240.05 |
| 2004/0066751 A1* | 4/2004 | Tseng et al. | ................ | 370/252 |

* cited by examiner

Primary Examiner—Kevin C. Harper
(74) Attorney, Agent, or Firm—John Smith-Hill; Smith-Hill and Bedell

(57) ABSTRACT

Variation in delay in transmission of data from a transmitting station to a receiving station is measured by encapsulating a portion of the data and an outgoing time stamp in a packet, the outgoing time stamp substantially representing the degree of progression of a periodic process at the time of including the outgoing time stamp in the packet. The packet is transmitted from the transmitting station and is received at the receiving station. At the receiving station, an incoming time stamp is added to the packet. The incoming time stamp substantially represents the degree of progression of a periodic process at the time of adding the incoming time stamp to the packet. The incoming time stamp is compared to the outgoing time stamp.

9 Claims, 4 Drawing Sheets

METHOD AND APPARATUS FOR MEASURING QUALITY OF SERVICE PARAMETERS OF NETWORKS DELIVERING REAL TIME MPEG VIDEO

BACKGROUND OF THE INVENTION

This invention relates to a method and apparatus for measuring quality of service parameters of networks delivering real time MPEG video.

The MPEG-2 system layer defines the MPEG-2 transport stream, otherwise known as the MPEG transport stream or MTS. The MPEG transport stream is composed of fixed length packets, each 188 bytes (or octets) long and having a four byte header. The remaining 184 bytes are payload or some combination of adaptation field and payload.

The MPEG transport stream may be used for real time delivery of compressed program material (audio and video) over public and private packet-switched networks. Such real time delivery of compressed program material supports a wide variety of applications, including video back haul, video distribution, and broadband video conferencing.

FIG. 1 illustrates transmitting terminal equipment and receiving terminal equipment for delivering program material (audio and video) over a packet switched network employing the MPEG transport stream.

Referring to FIG. 1A, the transmitting terminal equipment includes an MPEG encoder 1 and a network interface driver 2. A conventional MPEG encoder for receiving uncompressed digital audio and video data and generating MTS packets may be considered to include an audio encoder 4 that receives the audio data and produces an audio packetized elementary stream (PES), a video encoder 6 that receives the video data and produces a video PES, a controller 8 that generates timing and other control data, and a multiplexer 10 that operates under control of the controller to select the audio PES, the video PES and the control data in the sequence that is required in order to compose the MTS packets.

The encoder 1 receives a 27 MHz program clock reference (PCR) with the video data and a divider 14 divides the output signal of the program clock generator 12 by 300 to provide 90 kHz system clock references for decoding and presentation. The controller 8 counts the cycles of the PCR and periodically samples the count value and includes the PCR value in the adaptation field. The controller also counts the cycles of the 90 kHz system clock reference and periodically samples the system clock count value and includes sample values in the adaptation field as a presentation time stamp (PTS) or a decode time stamp (DTS).

Although FIG. 1 shows only one video encoder and one audio encoder, it will be appreciated by those skilled in the art that an MPEG encoder may include several video and audio encoders.

A network interface driver suitable for placing MTS packets on an IP network may include a high level driver, which receives the MTS packets from the MPEG encoder and carries out high level functions, such as organizing the MTS packets as IP packets, a low level driver that receives a sequence of bits from the high level driver and delivers the bits to the point of egress of the network interface driver, and a controller that controls operation of the high level driver and low level driver. Referring to FIG. 1A, the high level driver of the network interface driver 2 includes a packetizer 16 that receives the MTS packets from the MPEG encoder 1, constructs an IP packet containing seven MTS packets, and loads the IP packet into a buffer memory 18. The buffer memory 18 may be considered to be part of the low level driver. The IP packets are read from the buffer memory 18 and are loaded into a FIFO output register 22. The FIFO output register may be implemented by two registers that are input and output enabled in alternating fashion. When the network interface driver 2 receives a packet request, the controller 26 enables the FIFO output register to output an IP packet from the network interface driver 1 at the egress point A.

Referring to FIG. 1B, the receiving terminal equipment includes a network interface driver 32 and an MPEG decoder 34. A network interface driver suitable for receiving IP packets from an IP network and providing MTS packets to an MPEG decoder typically includes a low level hardware driver that receives a sequence of bits at the point of ingress of the network interface driver and delivers the sequence of bits as an IP packet to a high level driver. The high level driver recovers the seven MTS packets from the IP packet and supplies the MTS packets to the MPEG decoder. The network interface driver 32 has an ingress point B that is connected to a FIFO input register 42. The FIFO input register 42 is input and output enabled by the controller 44 so that an IP packet received at the ingress point B is loaded into the register 42 and is subsequently written to a buffer memory 48. The register 42 may be implemented by two registers that are input and output enabled in alternating fashion. The data stored in the buffer memory is read out in the order received and supplied to a depacketizer 52, which outputs the seven MTS packets in the IP packet to the MPEG decoder.

In the network interface driver 32 the low level network interface driver includes the FIFO register 42 and the buffer memory 48 and the high level network interface driver includes the depacketizer 52.

The MPEG decoder 34 comprises a demultiplexer 56 that operates under control of a controller 58 to divide the incoming MTS packets into the audio PES, the video PES and control data, an audio decoder 62 that outputs the audio data as a continuous stream and a video decoder 66 that outputs the video data as a continuous stream.

The controller 58 detects the PCR samples included in the MTS packets. A program clock generator 70 includes a phase-locked loop that uses the PCR sample values from the controller 58 to generate a 27 MHz program clock reference that is synchronized with the program clock reference received by the encoder 1. The decoder further includes a divider 74 that derives 90 kHz system clock references by dividing the 27 MHz program clock reference by 300.

Applications that employ MTS packets for real time delivery of compressed program material are very sensitive to video quality. An important determinant of video quality is the extent to which the network delivers the MTS packets with constant delay. Desirably, the variation in delay should not exceed about 2 ms. In addition, it is desirable that there should be no loss of packets or out of order packets, and no bit errors. Because delivery is real time and the MPEG bit stream is not error resilient, packet loss and packet bit errors may lead to noticeable visual artifacts.

Typically, a customer desiring to deliver real time compressed video over a public or private network will contract with the network operator for transport of the video according to a service level agreement, which may or may not define quality of service (QoS) parameters and the values of these parameters that the network operator is willing to provide. A customer may wish to be able to measure the actual performance of the network in terms of accepted QoS parameters, particularly when visual artifacts are being observed. Because the internet protocol (IP) does not inherently support guaranteed values of QoS parameters, it is very difficult for a customer to have an independent means for determining the actual QoS that the network delivers.

SUMMARY OF THE INVENTION

In accordance with a first aspect of the invention there is provided a method of measuring variation in delay in transmission of data from a transmitting station to a receiving station, wherein a first periodic process at the transmitting station progresses at substantially the same frequency as a second periodic process at the receiving station, said method comprising encapsulating a portion of said data and an outgoing time stamp in a packet, said outgoing time stamp substantially representing a degree of progression of the first periodic process at the time of including the outgoing time stamp in the packet, transmitting the packet from the transmitting station to the receiving station, receiving said packet at the receiving station, adding an incoming time stamp to the packet, the incoming time stamp substantially representing a degree of progression of the second periodic process at the time of adding the incoming time stamp to the packet, and comparing the incoming time stamp to the outgoing time stamp.

In accordance with a second aspect of the invention there is provided a method of measuring variation in transmission delay of data from a transmitting station to a receiving station, wherein the data includes a synchronizing component that allows a first periodic process at the receiving station to be synchronized with a second periodic process at the transmitting station, said method comprising encapsulating portions of said data in respective packets, inserting respective values of an outgoing time stamp in said packets, each value of the outgoing time stamp substantially representing a degree of progression of the second periodic process at the time of inserting the respective value of the outgoing time stamp in the packet, transmitting the packets from the transmitting station to the receiving station, receiving said packets at the receiving station, adding respective values of an incoming time stamp to said packets, each value of the incoming time stamp substantially representing a degree of progression of the first periodic process at the time of adding the respective value of the incoming time stamp to the packet, and comparing the values of the incoming time stamp and outgoing time stamp in each packet.

In accordance with a third aspect of the invention there is provided an improved method of transmitting data from a transmitting station to a receiving station, comprising encapsulating portions of the data in respective packets at the transmitting station, transmitting the packets from the transmitting station to the receiving station, receiving the data packets at the receiving station, and recovering the data portions from the packets at the receiving station, wherein the improvement comprises inserting a data element representing a count value in each packet at the transmitting station, the count value at least partially reflecting the number of packets transmitted from the transmitting station, recovering said data elements at the receiving station, and determining on the basis of the data elements whether a packet is missing or has been received out of order.

BRIEF DESCRIPTION OF THE DRAWINGS

For a better understanding of the invention, and to show how the same may be carried into effect, reference will now be made, by way of example, to the accompanying drawings, in which FIGS. 1A and 1B, which may be referred to collectively as FIG. 1, show a simplified functional block diagram illustrating transmitting and receiving terminal equipment in accordance with the prior art, and FIGS. 2A and 2B, which may be referred to collectively as FIG. 2, show a simplified functional block diagram of transmitting and receiving terminal equipment embodying the present invention.

A component that is shown in FIG. 2 and has the same or a corresponding function to a component that is shown in FIG. 1 is designated in FIG. 2 by a corresponding three-digit reference character having the prefix 1.

DETAILED DESCRIPTION

Figure 1A:
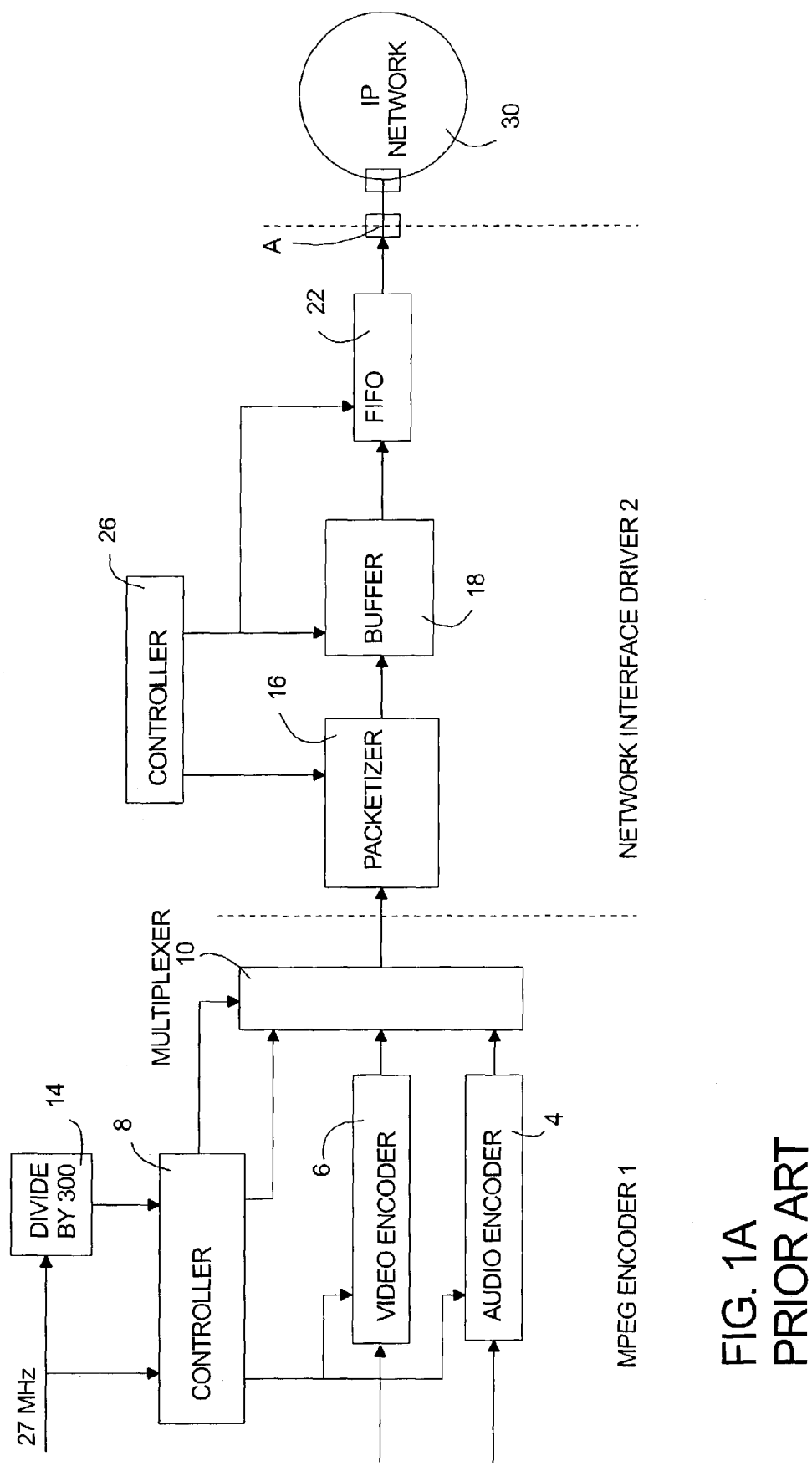
Figure 1B:
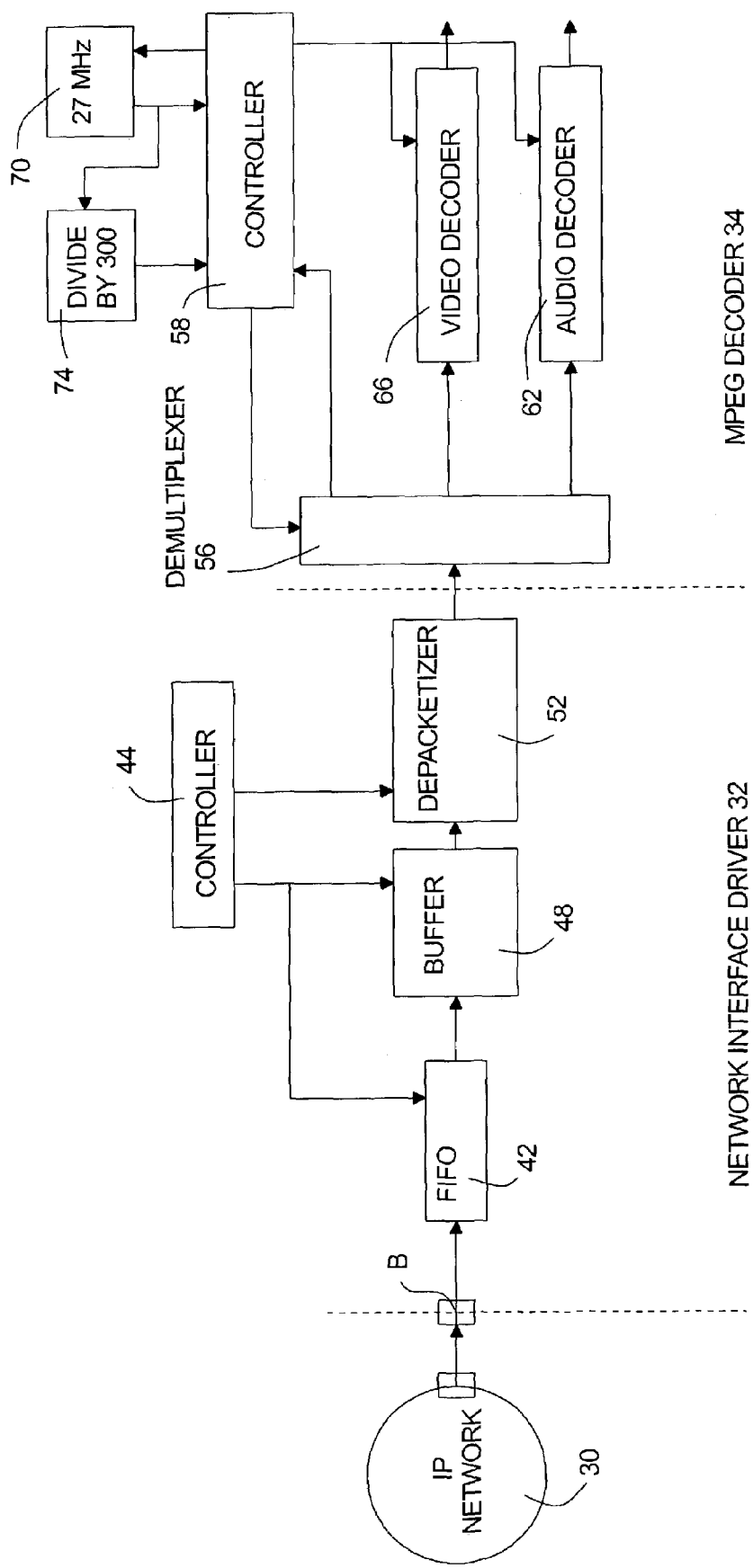

FIG. 2 illustrates a network customer's transmitting terminal equipment and receiving terminal equipment connected to an IP network. The transmitting terminal equipment includes an MPEG encoder 101 and a network interface driver 102. The topology of the MPEG encoder 102 is essentially the same as that of the MPEG encoder 1 shown in FIG. 1. However, the controller 108 controls the multiplexer 110 to provide space in the multiplex to accommodate five additional bytes of data to be inserted by the network interface driver 102 in the private data bytes of an adaptation field in the first MTS packet of each IP packet, for a reason that will be explained below. In controlling the multiplexer 110 to reserve this space in the multiplex, the controller 108 acts in response to commands received from the controller 126 of the network interface driver.

The network interface driver has an egress point A (typically the receptacle of a network card) that is connected to the ingress point S of the network (typically a receptacle that is connected to physical network wiring) by a suitable jumper cable. The receiving terminal equipment includes a network interface driver 132 that has an ingress point B connected to the egress point R of the network by a jumper cable. The receiving terminal equipment also includes an MPEG decoder 134.

Figure 2A:
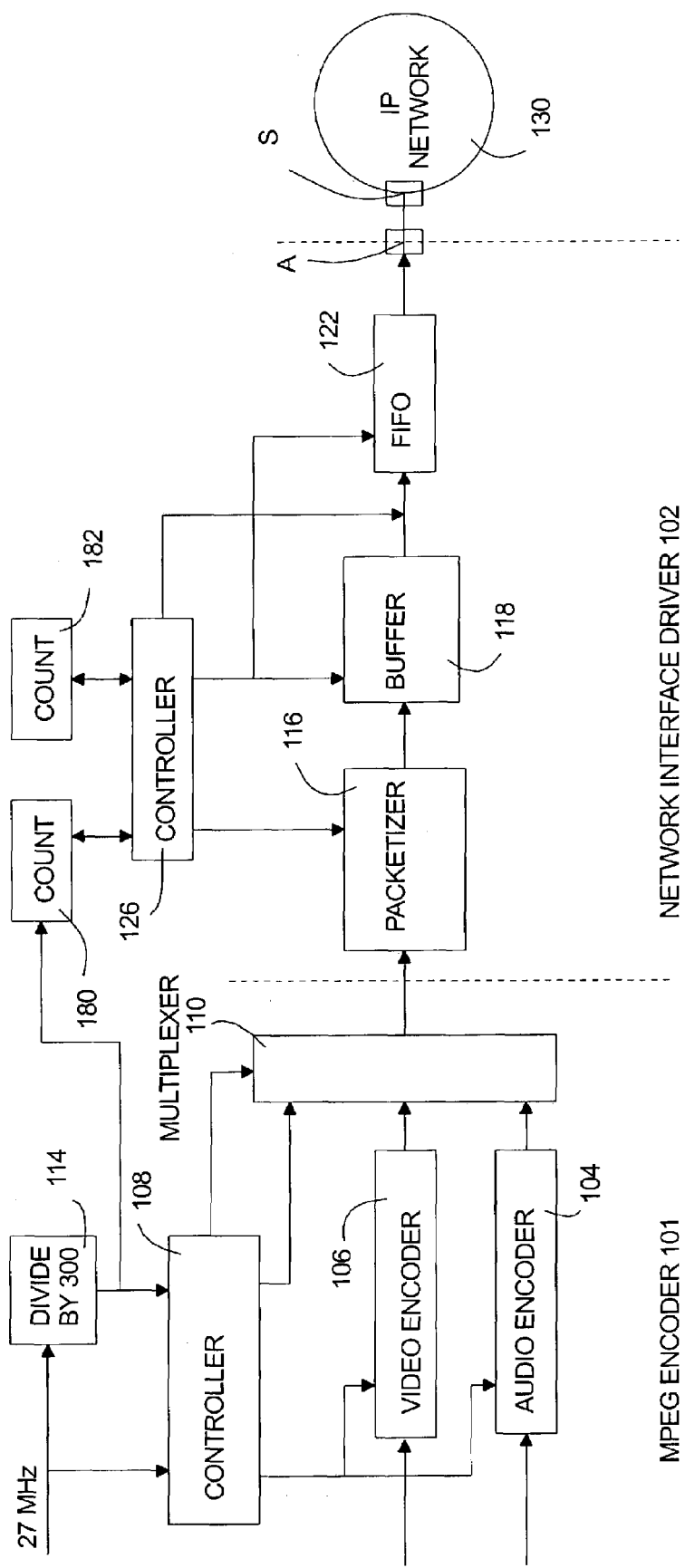

The network interface driver 102 includes a 24 bit counter 180 that counts the 90 kHz system clock reference provided by the divider 114. Once for each IP packet, the controller 126 samples the count value as an outgoing_time_stamp. The command to sample the count value may be placed in the program flow of the software driver just before the software driver indicates to the hardware the address in the buffer memory 118 of the next IP packet to be loaded into the FIFO output register 122. Further, the network interface driver 102 includes an 8 bit IP packet counter 182 that counts the number of IP packets written to the FIFO output register, e.g. by counting the number of times that the FIFO register is input enabled by the controller 126. The controller 126 samples the IP packet count value as a sequence_number. The controller applies a cyclic redundancy check to the outgoing_time_stamp and the sequence_number and calculates an 8 bit value CRC in the same manner that the header error check (HEC) is calculated in the ATM cell header. The controller inserts the additional five bytes (outgoing_time_stamp, sequence_number and CRC) into the IP packet in the low level hardware driver. FIG. 2A indicates that the additional bytes are inserted into the sequence of bytes loaded into the FIFO register 122 from the buffer memory 118. The additional bytes are placed in the space that is reserved in the first MTS packet of the IP packet, as discussed in connection with the operation of the controller 108. Placing the additional bytes in the private data bytes of the adaptation field incurs three additional overhead bytes to hold adaptation- _field_length, transport_private_data_flag, and transport_private_data_length, but this is the preferred location because it is completely transparent to any standard's compliant receiving terminal equipment. However, the additional bytes could instead be placed in the IP packet after the seven MTS packets, and in this case the overhead would be less and it would not be necessary to reserve space in the multiplex of the MTS packets.

Figure 2B:
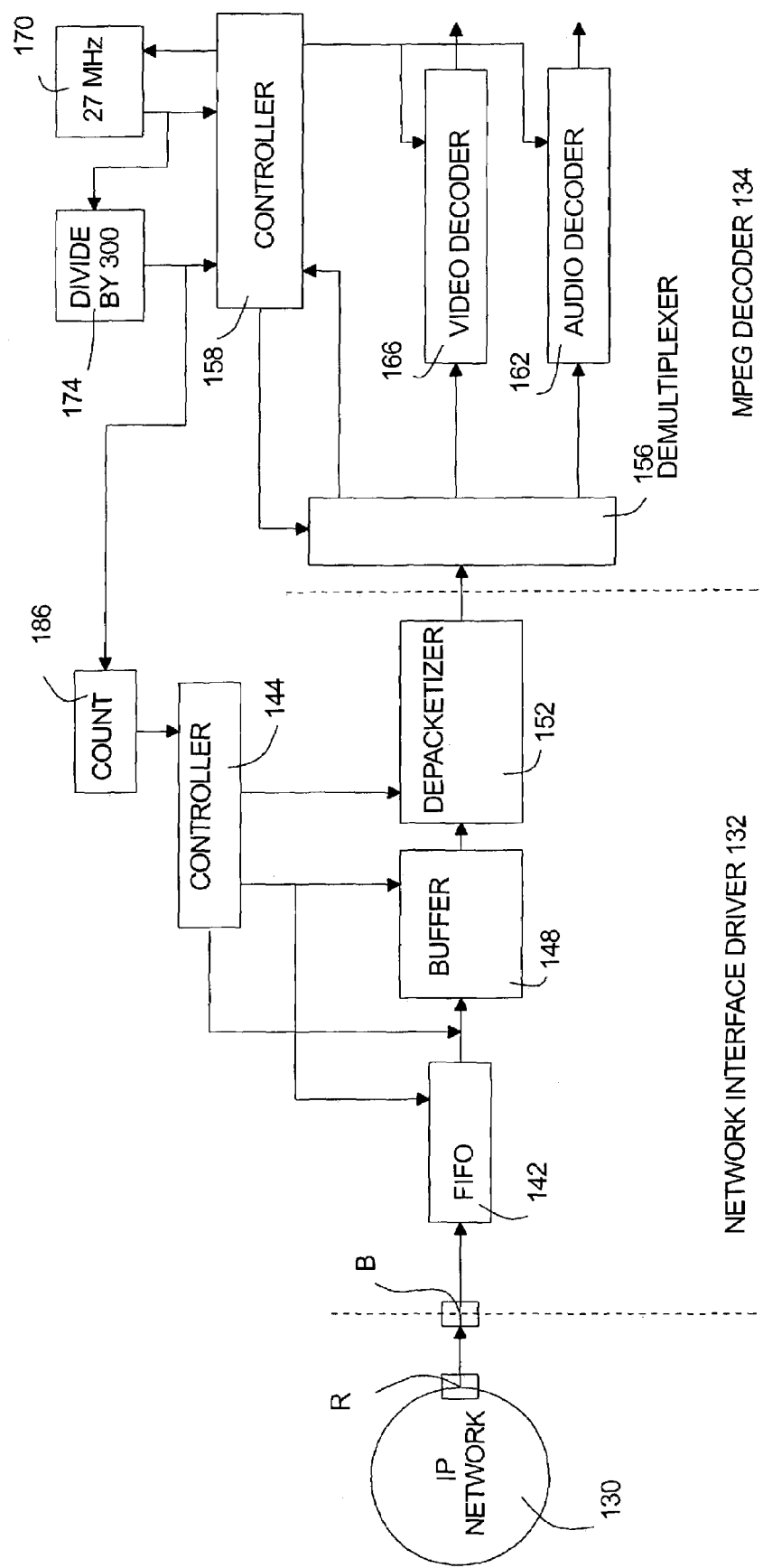

The network interface driver of the receiving terminal equipment includes a 24 bit counter 186 that counts cycles of the system clock reference provided by the divider 174. The controller 144 samples the recovered system clock count and creates an incoming_time_stamp value of 24 bits. Preferably, the command for sampling the recovered system clock count and providing the incoming_time_stamp is included in the program flow either in the interrupt service routine for incoming packets or (in the case of an Ethernet driver) when the low level driver has been notified that data is available. The controller inserts the sample value into the incoming IP packet in the low level driver. FIG. 2B indicates that the three additional bytes are inserted in the stream of data passing from the FIFO input register 142 to the buffer memory 148. The depacketizer strips the IP overhead from the IP packet and creates MTS packets, which it supplies to the MPEG decoder. The first MTS packet of each IP packet contains the private data bytes. The controller 158 identifies the private data bytes in the adaptation field of every seventh MTS packet and recovers the eight additional bytes. The controller checks whether the CRC bits are properly related to the outgoing_time_stamp and sequence_number and, if so, checks whether the sequence_number indicates that the packet arrived in order or out of order or whether a packet has been lost. If an exact integer multiple of $2^8$ packets in a row were lost, the sequence number would be indistinguishable from no packets having been lost, but the probability of this occurring is very small.

The actual delay (in units of $1/90,000$ second) suffered by the i'th IP packet between point S (egress on the physical interface to the network) and point R (ingress from the physical interface to the network) in FIG. 2 can be expressed as:

$$delay_i = ingress\_time_i - egress\_time_i + clock\_drift + constant \pm u,$$

where all the arithmetic is modulo $2^{24}$ and $ingress\_time_i$ is the value placed in the incoming_time_stamp field for the i'th packet, $egress\_time_i$ is the value placed in the outgoing_time_stamp field for the i'th packet, clock_drift is zero if the incoming_time_stamp is sampled with the recovered system clock of the program being received as defined above, constant is the phase difference between the outgoing and incoming system clocks plus the minimum time it takes for a packet to traverse between points A and S plus the minimum time it takes for a packet to traverse between points R and B, u is the sum of the maximum deviations from the minimum times for packets to traverse between points A and S and between points R and B and is the delay variation due to the operating system and network driver; typical value is less than 100 microseconds (or 9 units of $1/90,000$ second) for a gigabit Ethernet interface card.

The maximum network delay variation is then the minimum value of $delay_i$ subtracted from the maximum value of $delay_i$ or $$\max\{delay_i\} - \min\{delay_i\} =$$
$$\max\{ingress\_time_i - egress\_time_i + (clock\_drift + constant \pm u)\} - \min\{ingress\_time_i - egress\_time_i + (clock\_drift + constant \pm u)\}.$$

If both the incoming and outgoing time stamps are sampled from a 27 MHz clock meeting the frequency requirements of a systems clock given in ITU-T rec. H.222.0, namely that the frequency drift is no more than $75 \times 10^{-3}$ Hz/sec, then even if the clocks are independent, the maximum relative drift per hour is no more than $2 (60) (60) (75) (10^{-3})$, or 540 ticks of the 27 MHz clock or 1.8 in units of $1/90,000$ second or about 20 microseconds. In the calculation of maximum network delay variation, clock drift is considered to be a constant for all practical purposes. Accordingly, the maximum network delay variation is then equal to:

$$\max\{ingress\_time_i - egress\_time_i\} - \min\{ingress\_time_i - egress\_time_i\} \pm 2u.$$

The net result is that the network customer can measure the variation in network delay to within an accuracy of about 10 units of $1/90,000$ second. A maximum network delay variation less than 2 milliseconds (180 in units of $1/90,000$ second) is acceptable for any MPEG decoder.

It will be understood that if an IP packet is lost then the maximum delay becomes infinite. By counting only the packets that are received we remove from consideration any lost packets.

It will be appreciated that the invention is not restricted to the particular embodiment that has been described, and that variations may be made therein without departing from the scope of the invention as defined in the appended claims and equivalents thereof. For example, although the invention has been described with reference to delivery of MTS packets over an IP network, the invention is applicable to delivery of other material, such as multimedia material in general, over other networks, such as ATM networks. Further, although the detailed description refers to the controller 108 operating in response to the controller 126 in reserving space in the multiplex to receive bytes inserted by the network interface driver, other schemes are possible. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A method of measuring variation in propagation delay for network packets transmitted from a transmitting station to a receiving station, wherein a first periodic process at the transmitting station progresses at substantially the same frequency as a second periodic process at the receiving station, said method comprising the steps:
   a) generating a network packet,
   b) encapsulating a plurality of data packets in the network packet,
   c) generating an outgoing time stamp and inserting the outgoing time stamp into the network packet, said outgoing time stamp substantially representing a degree of progression of the first periodic process at the time of including the outgoing time stamp in the network packet, d) transmitting the network packet from the transmitting station to the receiving station, e) receiving said network packet at the receiving station, f) generating an incoming time stamp and adding said incoming time stamp to the network packet, said incoming time stamp substantially representing a degree of progression of the second periodic process at the time of receiving said network packet, g) comparing the incoming time stamp to the outgoing time stamp to obtain a first delay measurement for the network packet, h) repeating steps a–g at least twice to obtain at least second and third delay measurements, and i) comparing the first, second and third delay measurements to obtain maximum and minimum delay measurements and comparing the maximum and minimum delay measurements.

2. A method according to claim 1, wherein the method comprises the step of, prior to step b, creating a reserved space in one of the plurality of data packets and step c comprises inserting the outgoing time stamp into said reserved space.

3. A method according to claim 1, wherein the plurality of data packets are MTS packets and step b comprises encapsulating MTS packets in an IP packet.

4. A method according to claim 1, wherein the first periodic process is evolution of a first clock reference, the second periodic process is generation of a second clock reference, the data packets include a synchronizing component, and the method includes synchronizing generation of the second clock reference with evolution of the first clock reference.

5. A method according to claim 4, wherein the method further comprises, in parallel with steps a through i, counting the first and second clock references, step c comprises including a first count value of the first clock reference in the network packet transmitted from the transmitting station, step f comprises including a second count value of the second clock reference in the network packet received at the receiving station, and step g comprises comparing the first and second count values.

6. A method according to claim 1, wherein the network packets are IP packets, the data packets comprise packetized elementary stream data and step b comprises encapsulating PES data in MTS packets and encapsulating a plurality of MTS packets in an IP packet.

7. A method according to claim 6, wherein step b comprises encapsulating the outgoing time stamp in one of said plurality of MTS packets.

8. A method according to claim 6, comprising employing an encoder to encapsulate the PES data in the MTS packets and employing a network interface driver to encapsulate said plurality of MTS packets in the IP packet, and the method further comprises employing the network interface driver to insert the outgoing time stamp into said one MTS packet.

9. A method according to claim 8, comprising employing a second network interface driver at the receiving station to insert the incoming time stamp into the IP packet.

* * * * *